Dec. 13, 1938. W. MOSSBACK 2,140,478
TIRE GROOVING TOOL
Filed June 1, 1937
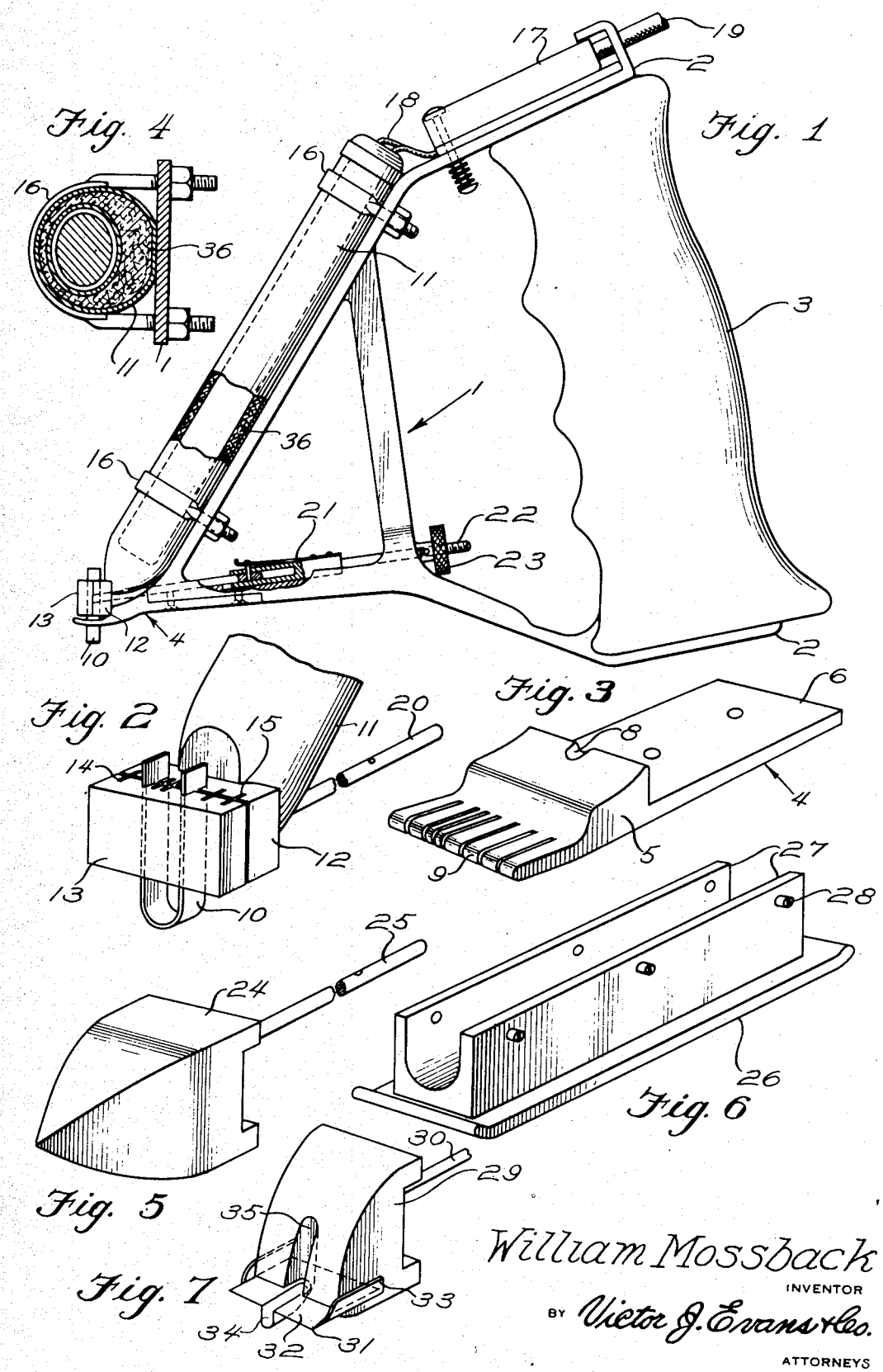
William Mossback
INVENTOR
BY Victor J. Evans & Co.
ATTORNEYS Patented Dec. 13, 1938

2,140,478

UNITED STATES PATENT OFFICE 2,140,478

TIRE GROOVING TOOL

William Mossback, Seattle, Wash.

Application June 1, 1937, Serial No. 145,851

1 Claim. (Cl. 30—140)

This invention relates to tire grooving tools especially adapted for forming non-skid grooves in the treads of tires after the original non-skid treads have been worn away and has for the primary object the provision of a portable electrically heated device of this character which will permit a person to accurately and rapidly form grooves by cutting the rubber of the tire, the cutter of the device being heated aids in cutting the rubber rapidly and accurately.

Another object of the invention is the provision of means whereby the groove forming blade may be easily adjusted to form grooves of different sizes and will permit the removal of the blade when desiring to employ attachments such as a soldering iron head or a rubber curing element on the tool.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a tire grooving tool constructed in accordance with my invention.

Figure 2 is a fragmentary perspective view showing the mounting of the cutter blade.

Figure 3 is a perspective view illustrating the shoe.

Figure 4 is a transverse sectional view illustrating the means of securing the heating element on the frame of the tool.

Figure 5 is a perspective view illustrating a soldering iron head attachment for the tool.

Figure 6 is a perspective view illustrating an attachment to be employed in connection with the tool for curing rubber.

Figure 7 is a perspective view illustrating a modified form of my invention.

Referring in detail to the drawing, the numeral 1 indicates a substantially triangular shape frame having diverging extensions 2 on which is mounted a handle or hand grip 3. The apex of the frame is disposed forwardly of the handle or hand grip 3 and has removably secured thereto a shoe 4. The shoe 4 includes a block-like portion 5 integral with an attaching plate 6 apertured to receive fasteners for securing the latter onto the frame. The top wall of the block 5 is concave so as to be spaced from a heater 11 carried by the frame and is also provided with a groove or notch 8. The heater 11 is spaced from the shoe to prevent heating of the latter. Integral with the block 5 and extending forwardly thereof are parallel spaced guard elements or fingers 9 through which may extend a cutting element 10.

Removably mounted on the frame 1 is the electrical heating element 11, one end of which is integral with a face plate 12 arranged above the fingers 9. The face plate 12 is heated by the electrical heating element 11 and cooperates therewith in removably and adjustably securing the blade 10 is a block 13. Grooves 14 are formed in the block 13 and grooves 15 are formed in the face plate 12. The grooves 14 and 15 are matched to permit the adjustment of the blade 10 laterally of the tool in either direction. Certain of said grooves 14 and 15 are located closer to each other than the other grooves 14 and 15 whereby a rearrangement of the cutting element in the grooves may bring about an expansion or contraction of the blade. The blade is of substantially U-shape, as shown in Figure 2, and is heated by the face plate 12 so that when brought into engagement with a tread of a tire and the tool shoved forwardly along the tread, the rubber will be easily and quickly cutaway to form a groove of a selected size. Grooves formed in a tread of a worn tire by this tool will restore the tread with an efficient non-skid surface by the grooves defining therebetween ribs. The spaces between the fingers 9 of the shoe 4 align with the slots 14 and 15.

The heating element 11 is detachably mounted on the frame by U-clamps 16 and it is preferable that one wall of the casing of the electrical heating element be flattened to rest on the frame, as shown in Figure 4. An electrical detachable plug 17 is mounted on the frame adjacent one end of the handle or hand grip 3 and is electrically connected to the heater by conductors 18. Electrical conductors forming an extension cord 19 are connected to the plug 17 whereby the tool may be plugged into an electrical output. The plug 17 permits the extension cord 19 to be disconnected from the tool when desiring to pack the tool away.

The clamping block 13 has formed thereon a rod 20 which passes through the face plate 12 and the notch 8 in the shoe 4 and is detachably secured in a chuck 21. The chuck 21 is slidably mounted on the frame 1 and includes a screw threaded rod 22 which extends through a portion of the frame and has threaded thereon a nut 23. The nut bears against the frame and by rotating the nut in one direction the clamping block may be drawn towards the face plate 12 and when rotated in an opposite direction will be moved away from said face plate. At any time when it is desired to employ the heating element 11 for the purpose of heating a soldering iron head 24 the block 13 is removed by detaching the rod 20 from the chuck 21. This frees blade 10. The soldering iron head 24 is then brought into engagement with the face plate 12 to be heated thereby. A rod 25 is secured to the head 24 and is similarly constructed to the rod 20 to be received by the chuck 21. At any time when it is desired to employ the heating element 11 for curing rubber, a plate 26 including spaced members 27 is mounted on the heating element, the spaced members straddling said heating element. Set bolts 28 are carried by the members 27 to engage with the heating element to retain the plate 26 thereon. To cure rubber the tool is inverted to bring the plate 26 into engagement with the rubber to be cured.

In Figure 7 is shown a modified form of device for forming grooves in a tire and consists of a block 29 to engage the face plate 12 of the heater and is equipped with a rod 30 to be received by the chuck 21. The block 29 is grooved to receive a blade 31 consisting of a plate 32 received in the groove and having upturned flanges 33 to frictionally contact the sides of the block 29. The plate 32 is offset to form a channel cut 34, the rear end of which is closed and communicates with an upwardly extending groove 35 formed in the block. The block 29 is heated and the blade 31 being carried thereby will also be heated so that by running the blade along the tread of a tire the channeled portion will gouge into the rubber with a cutting action removing the rubber in groove form.

The electrical heating element 11 may have the casing thereof insulated, as shown at 36, to prevent the heating element from heating the major portion of the frame 1.

In operation, the shoe 4 gauges the action of the blade 10 when cutting the rubber or tire to form the grooves therein. When employing the form of the invention shown in Figure 7, the shoe 4 may be omitted.

A tool of the character described can be easily handled or manipulated by a person and the person will not be subjected to excessive heat.

What is claimed is:

A tire grooving tool comprising a substantially triangular shaped frame including extensions, a hand grip connecting said extensions with the apex of the frame positioned forwardly thereof, a heating tool mounted on one side of the frame and extending to the apex of said frame, a guard plate secured on the frame and extending forwardly of the apex of the frame and having slots, a face plate engageable with said guard and heating element and having slots aligning with the slots of the guard plate, a clamping block engaging the face plate and having slots aligning with the slots of the face plate and the guard plate, a substantially U-shaped cutting element arranged in the slots of the face plate, guard plate and the clamping block, a rod formed on the clamping block and extending through the face plate and the frame, and an adjusting means carried by the frame and detachably secured to said rod for the adjustment of the clamping block relative to the clamping plate.

WILLIAM MOSSBACK.